No. 743,534. PATENTED NOV. 10, 1903.
F. DE MARE.
ELECTROTHERMAL DIFFUSER.
APPLICATION FILED JUNE 27, 1902.
NO MODEL. 2 SHEETS—SHEET 1.
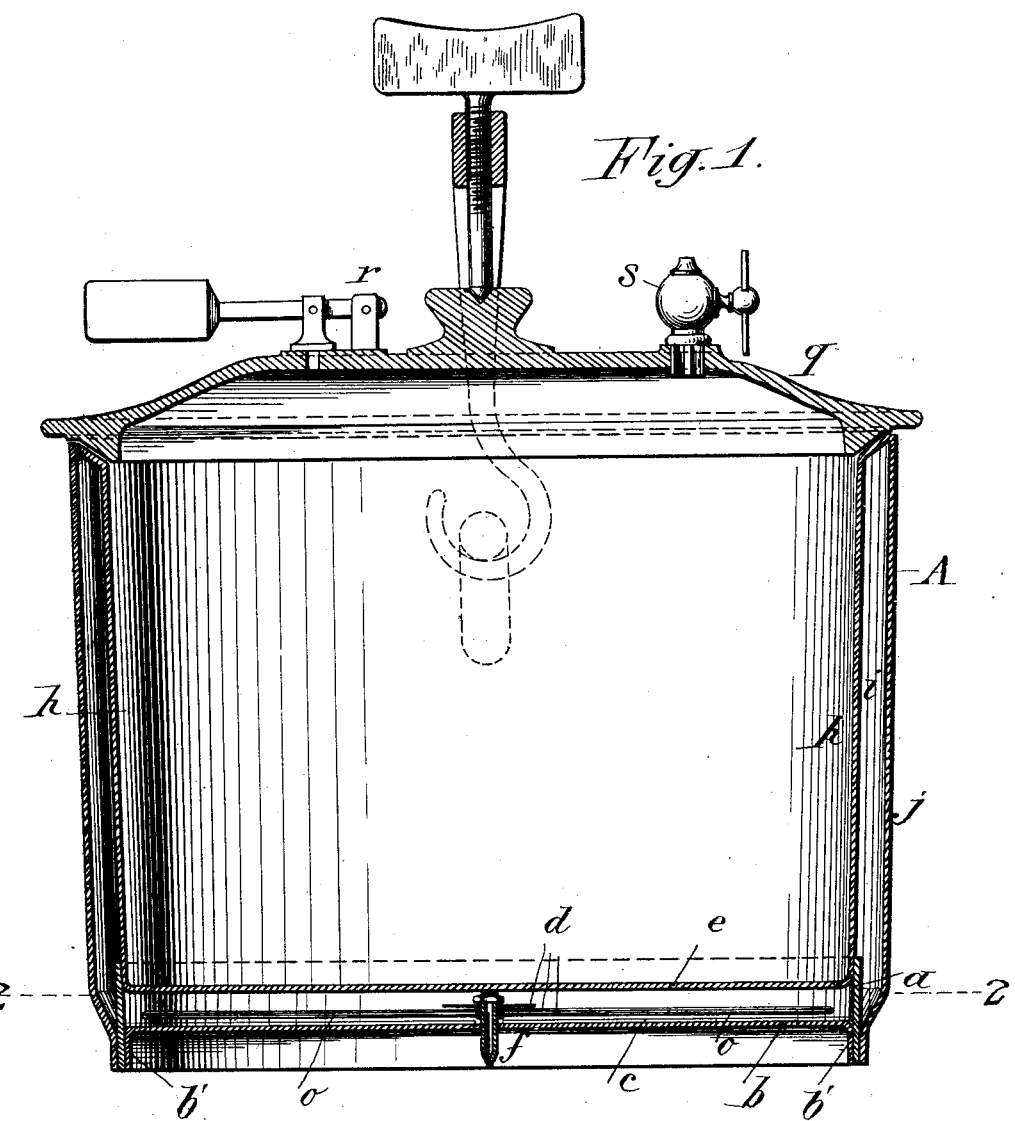
Witnesses:
L. Waldman
E. Hannah
Inventor:
Frederic de Mare
per B. Singer
Attorney.

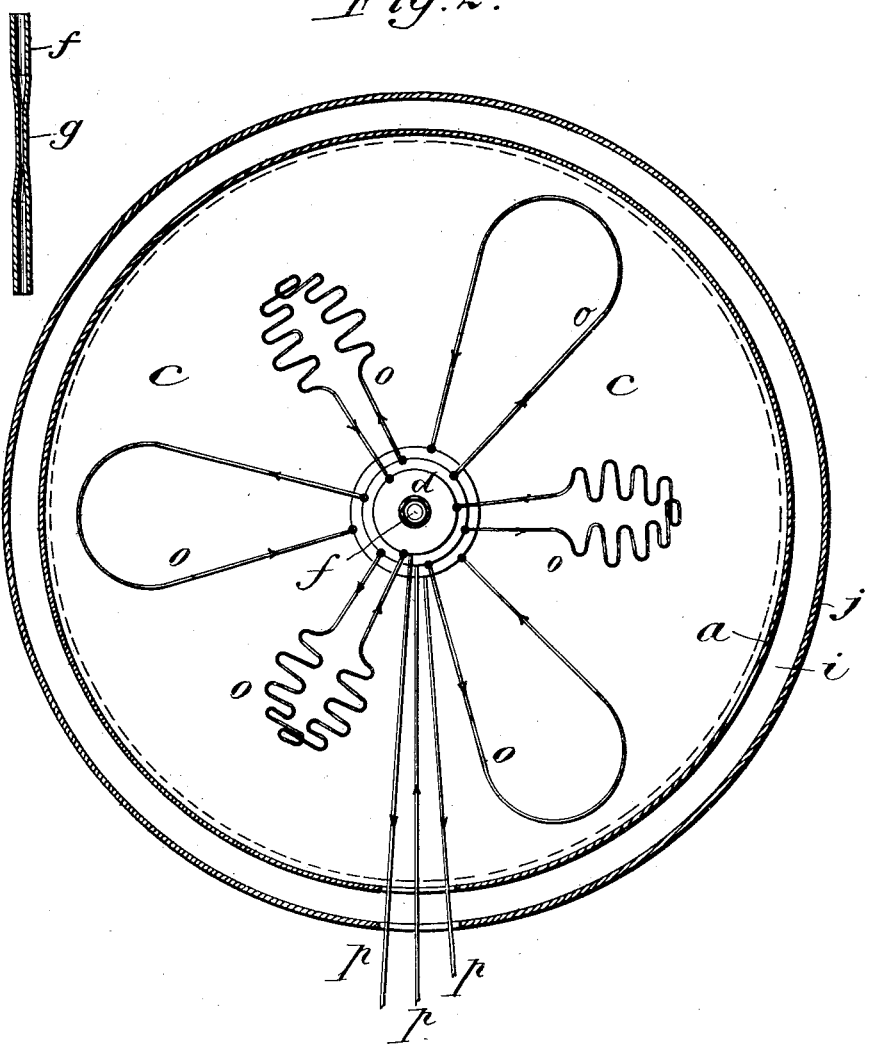

No. 743,534. Patented November 10, 1903.

UNITED STATES PATENT OFFICE.

FREDERIC DE MARE, OF BRUSSELS, BELGIUM.

ELECTROTHERMAL DIFFUSER.

SPECIFICATION forming part of Letters Patent No. 743,534, dated November 10, 1903.

Application filed June 27, 1902. Serial No. 113,496. (No model.)

*To all whom it may concern:*

Be it known that I, FREDERIC DE MARE, a citizen of the French Republic, and a resident of Brussels, Belgium, have invented certain new and useful Improvements in Electrothermal Diffusers, of which the following is a specification.

Among the substances employed as resistants in electric-heating apparatus the preference must be given to carbon on account of its great resisting power and its infusibility. Nevertheless those advantages are annihilated by the property possessed by carbon of combining with oxygen when at red heat. This can of course be overcome by placing the resistant in a vacuum-tube; but another inconvenience then appears. The calorific convection is feeble in the vacuum. The number of thermal units produced becomes less, owing to the fact that the medium to be heated is not in immediate contact with the heater, but with its envelop, and that the temperature of this envelop is much lower not alone owing to its greater surface, but, above all, to the slow thermic changes in the vacuum. It is with a view to remedy these defects that I utilize the great convective power of gases and vapors and the inactivity of carbon for certain of them in order to obtain resistants having very nearly the same thermic result as if they were in open air. I again increase the thermal product by using a metal casing—in blackened copper, for instance—of which the conductive power and emission are greater than that of glass.

To recapitulate, my invention consists in first inclosing a thread of carbon or of metal resistance in a case or cylinder of any form appropriate to the result sought for, and then completely exhausting the air from the cylinder, and finally introducing an atmosphere from one of the following gases or vapors: hydrogen, ammonia, carbonic oxid, silicate of hydrogen, nitrogen, oil gas, acetic ether, acetic acid.

The case or cylinder may be composed of any substance, metal by preference, and that metal should also be blackened. If it is of glass, the glass should be either black or dark red. I apply, moreover, this same principle with metallic or other filaments or conductors in cases where it is profitable to substitute them under the same conditions for filaments, rods, or tubes of carbon.

In the drawings, Figure 1 is a central vertical section through a so-styled "Papin's digester," showing my apparatus applied thereto. Fig. 2 is a horizontal section taken upon the line 2 2 of the foregoing figure. Fig. 3 is an enlarged detail.

Exception is taken to heating by electricity on account of its cost; yet it is of all systems that best adapted for obtaining a high degree of heat. It is only necessary that it be judiciously applied. From this point of view and as exemplifying the application of my electrothermal diffuser I show in Fig. 1 of the annexed drawings a combination which I form of my apparatus with Papin's digester, the economical advantage of which is demonstrated by experience.

To the bottom of a metallic utensil I solder or braze a narrow hoop $a$, inside of which I fix a metal bottom $b$, with a rim $b'$, so that the whole forms a chamber or double bottom to the utensil. On this bottom I place an insulating-disk $c$ in asbestos, mica, or other insulating and incombustible substance. This disk serves as a support to two or three thin metallic pieces $d$ in rosette form, utilized as thread-holders.

The filaments, straight, waved, or in U form, are connected and soldered to the pieces $d$ either in tension or in quantity and in one or two series. They are invariably fixed (but without interfering with their expansion) by mica fastenings.

The false bottom $b$ is polished, while the outer bottom $e$ of the utensil is blackened. A small tube $f$, brazed to the false bottom, serves first of all to purge off and exhaust the air from the interior and from the mica disk and for the subsequent filling with gases or vapors mentioned. Closing the tube is performed by cutting it with nipples, which crush it at the same time, a touch of solder insuring it air-tight, or by fusion of the tube with a blowpipe. For this the tube is compressed at $g$, Fig. 3, so as to render its fusion and sealing more rapid. The vertical sides $h$ of the receiver should, by preference, be polished and surrounded by a heat-retaining chamber $i$ between said wall and the jacket $j$, and the utensil itself is provided with a close-fitting lid or cover $q$, having safety-valve $r$ and a blow-off valve $s$ for steam generated in cooking. So arranged a cooking utensil is easily heated and as economically as possible.

The bottom $a$ of the utensil is blackened in order to increase its absorptive power, while the false bottom, polished and covered with asbestos, is rendered almost non-conductive of heat. The insulated disk $c$ serves as a support, not only to the current mains $p$, but also to the carbon threads $o$, and prevents their breaking.

The mounting of two or more independent series of threads permits regulation of temperature. The protection of a non-conducting envelop diminishes the waste of heat. The air-tight closing of the utensil by a lid furnished with a safety-valve realizes the maximum of possible economy.

In cases where the temperature to be obtained in certain instruments must be higher than the fusing-point of tin the joints would be brazed instead of soldered. In the utensil above referred to carbon may be replaced by metallic resistants. The great convective power of gases and vapors protects against fusion against an excess of voltage.

In the list of utilizable gases or vapors the great convective power of hydrogen, discovered by Grove and demonstrated by Magnus and Tyndall, invites the utilization of this gas at first instance, but in practice it offers inconvenience. If this gas is employed in an hermetically-sealed glass receptacle and it is wished to add light-rays to the dark rays, the expenditure of energy must be considerably increased, the number of the thermal units, owing to the small conductive power of glass, changing too slowly and the glass becomes heated to softening-point, rendering the receptacle useless. Therefore for such purposes I prefer metallic envelops, which are much more diffusant by the fact of their great heat-conducting power. Then arises, with hydrogen, another inconvenience. This gas, as is well known, has great penetrating power and it is difficult to retain it in metallic envelops having joints (as is the case here) for the passage of the wires, which must be insulated from the mantle by more or less porous material. The entrance of air is therefore to be feared, producing an explosive mixture. Therefore I give the preference to the other gases before named, even though their convective power is inferior to that of hydrogen.

I cite as example the employment of dry ammonia. Although of less convective power than hydrogen, its power is sufficient and I can employ without forcing, the filaments and glass bulbs giving light and heat at the same time. For filling metal envelops I give the preference to carbonic oxid, to nitrogen, and to acetic-ether vapor and for filling glass bulbs I recommend silicate of hydrogen, oil gas, and acetic acid.

Having now fully described my said invention, what I claim, and desire to secure by Letters Patent, is—

The combination, to form a heater, of a hermetically-closed receptacle exclusively filled with a highly-convective gas of the type described, a plurality of resistants therein, insulating means separating said resistants from each other and from the walls of the receptacle, and independent electrical circuits for each of said resistants.

In testimony whereof I have hereunto set my hand in presence of two witnesses.

FREDERIC DE MARE.

Witnesses:
  O. O. JEHR,
  GREGORY PHELAN.